April 14, 1936.  W. F. OLIVER  2,037,432
BRAKING APPARATUS
Filed Dec. 31, 1931  2 Sheets-Sheet 2

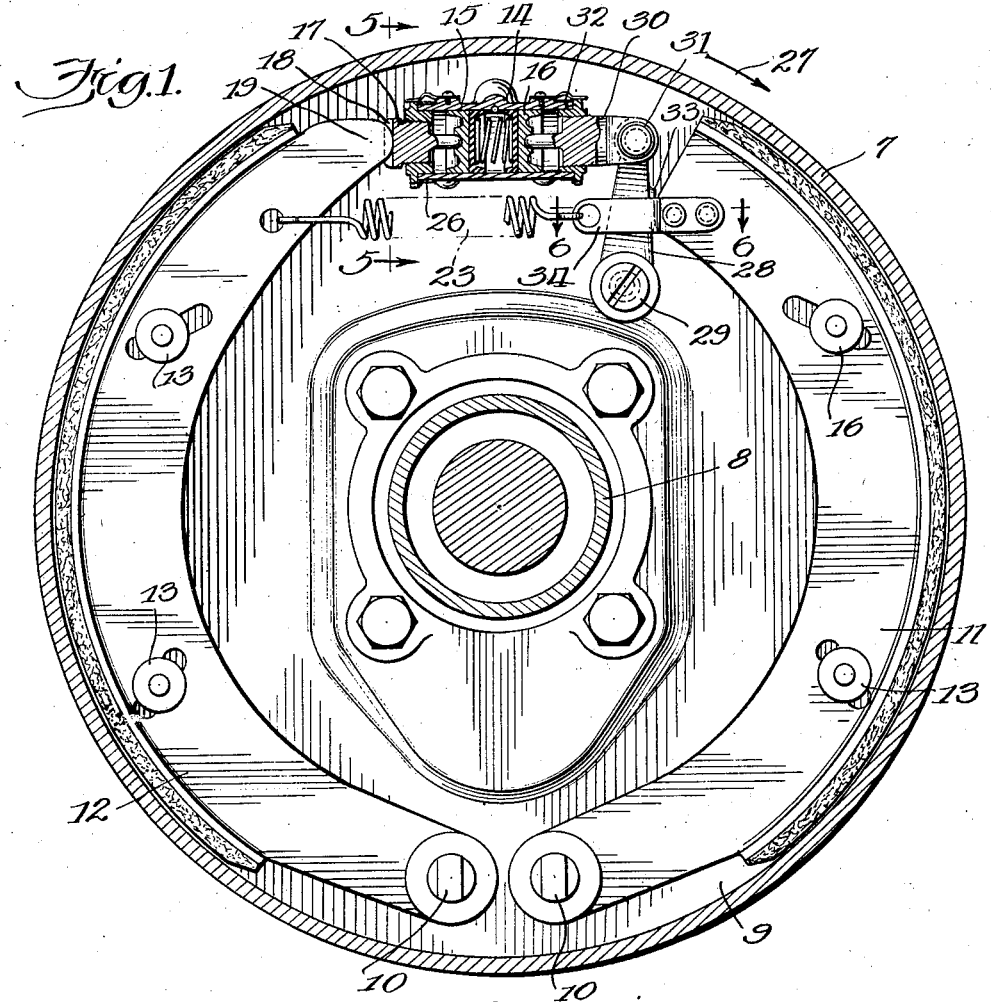

Inventor:
Wallace F. Oliver
By Williams, Bradbury,
McCaleb & Hinkle
Attys.

Patented Apr. 14, 1936

2,037,432

UNITED STATES PATENT OFFICE 2,037,432

BRAKING APPARATUS

Wallace F. Oliver, Detroit, Mich., assignor to Hydraulic Brake Company, Detroit, Mich., a corporation of California Application December 31, 1931, Serial No. 584,037

4 Claims. (Cl. 188—79.5)

My invention relates to braking apparatus and is particularly desirable for use in connection with the braking apparatus of automobiles and other motor vehicles, although it may also be applied to other uses. The present tendency in automobiles is to increase the weight and speed of the vehicle, while at the same time there is an insistent demand to decrease the effort necessary to handle such vehicles under all conditions, and also to decrease the amount of work required to maintain these vehicles in proper operating condition.

An object of my invention is to provide a more efficient brake system which will give increased braking effect without requiring the driver of the vehicle to exert increased effort on the operating controls.

Another object of this invention is to provide a braking system which may easily be adjusted and maintained at a state of maximum efficiency.

Another object is to provide a braking system having the foregoing features which is economical to manufacture, has a minimum number of parts, and is durable and absolutely reliable in service.

Other objects and advantages will become apparent as the description proceeds.

Referring to the drawings:

Figure 1 is a vertical elevation partly in section showing my invention applied to the wheel brake mechanism of an automobile;

Fig. 2 is an enlarged view of the left-hand end of the cylinder mechanism shown in Fig. 1 but showing a slightly different type of boot from that shown in Fig. 1;

Figure 3:
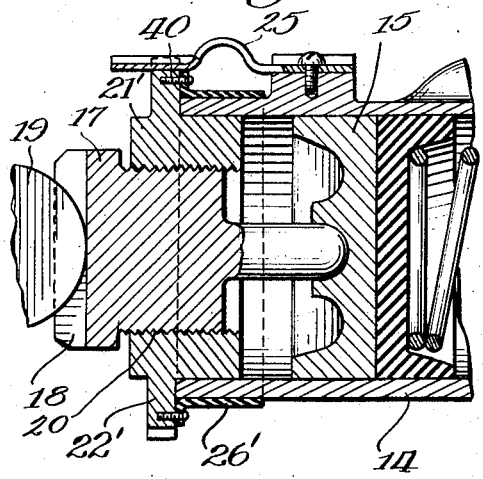
Figs. 3 and 4 are views similar to Fig. 2 but showing modifications of the structure shown in Fig. 2.

Referring to the embodiment shown in Figs. 1, 2, 5, and 6, I have illustrated my invention as applied to the wheel brake mechanism of an automobile, which consists in general of a brake drum 7 suitably secured to the vehicle wheel by any well known means, and an axle housing 8 to which is secured a pan 9 which cooperates with the brake drum 7 to provide an enclosure in which are located the operating parts of the brake mechanism. Supporting pins 10 are attached to the pan 9 and carry brake shoes 11 and 12 which are normally located in the positions shown but which are capable of movement into engagement with the brake drum 7 by mechanism which will be described hereinafter. The pan 9 also supports guides 13 which guide the brake shoes 11 and 12 during their movement to and from active and inactive position.

Figure 5:
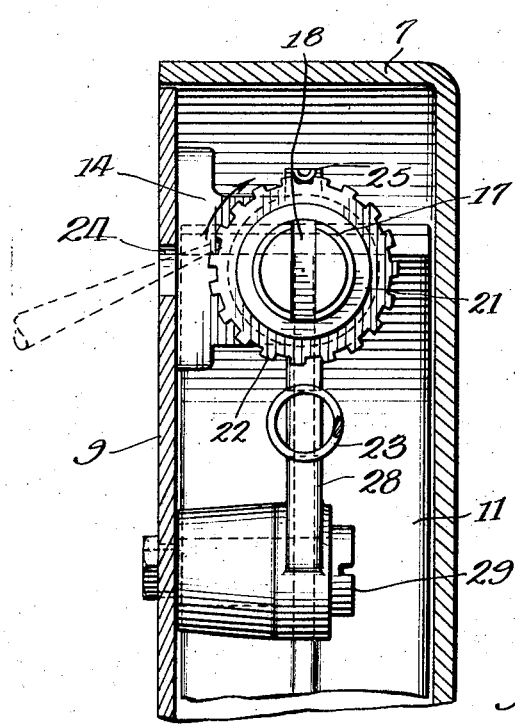
Fig. 5 is a vertical section taken on the line 5—5 of Fig. 1.
Figure 6:
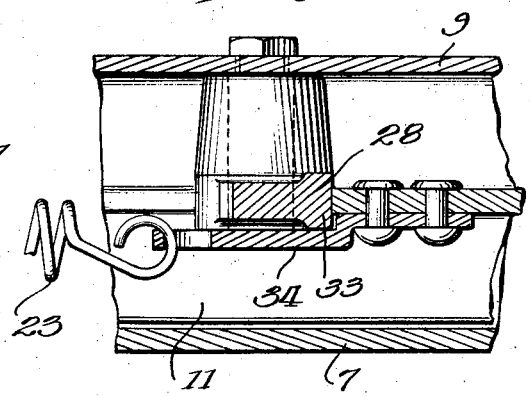
Fig. 6 is a horizontal section showing the detail taken on the line 6—6 of Fig. 1.

A motor cylinder 14 is suitably attached to the pan 9 between the free ends of the brake shoes 11 and 12. This motor cylinder is of uniform bore throughout and is provided with opposed pistons 15 and 16 which are operated to move the brake shoes 11 and 12 into braking engagement with the drum 7 when fluid under pressure is forced into the cylinder 14 by suitable fluid compressing means and conduits which may be of the type disclosed in United States Patent No. 1,758,671, or which may be of any other suitable or desirable type. The piston 15 is directly connected with the brake shoe 12 by a piston rod 17 which has one end rounded to fit into a socket formed in the rear side of the piston 15 and which forms a separable connection therewith. The other end of the piston rod 17 is provided with a slot 18 into which projects the rounded end 19 of the brake shoe 12. The engagement of the end 19 in the slot 18 prevents rotation of the piston rod 17. The piston rod 17 is enlarged adjacent the slot 18 and is provided with threads 20 which engage with the corresponding threads formed on the inner surface of an annulus 21. The annulus 21 has a projecting flange 22 which normally rests against the adjacent end of the cylinder 14 and forms a stop for limiting the inward movement of the brake shoe 12 under the action of its retractile spring 23. The periphery of the flange 22 is serrated as best shown in Fig. 5 and the adjacent portion of the pan 9 is provided with a suitable opening 24 through which a screw driver or other similar tool may be inserted to engage the serrations on the flange 22 and rotate the annulus 21 thereby moving the piston rod 17 to adjust the normal position of the brake shoe 12. The piston 14 carries a spring clip 25 which engages the serrations in the periphery of the flange 22 and holds the annulus 21 against rotation except when a tool is inserted for the purpose of adjusting the position of the brake shoes. A boot 26 of rubber or other suitable material excludes dust and moisture from the joint formed between the cylinder 14 and the annulus 21 and thereby cooperates with the annulus 21 and piston rod 17 in excluding dirt and moisture from that part of the cylinder which is in rear of the piston 15.

When the vehicle is moving in the forward direction the brake drum 7 rotates in the direction of the arrow 27 so that the brake shoe 11 is what is commonly referred to as the forward shoe, whereas the brake shoe 12 is what is commonly known as the trail shoe. It is well known that where equal pressures are applied to the forward shoe and the trailing shoe much more braking effect is created by the forward shoe. In order to increase the effectiveness of the braking apparatus without increasing the pedal pressure which the operator must exert I increase the force which is exerted on the forward shoe and thereby greatly increase the efficiency of the braking apparatus. I accomplish this by interposing a lever 28 pivoted to the pan 9 by pin 29 between the brake shoe 11 and the piston rod 30, which is pivoted to the upper end of the lever 28 by a pin 31 or any other suitable connection. The pin 31 prevents rotation of the piston rod 30 so that the off position of the brake shoe 11 can be adjusted by inserting a screw driver through an opening in the pan 9 and turning the annular member 32 in a manner similar to that used in adjusting the off position of the brake shoe 12.

At the point where the lever 28 contacts with the end of the brake shoe 11 the lever is provided with a boss 33 which in the present embodiment is located midway between the pins 29 and 31 so that twice as much force is exerted on the brake shoe 11 as on the brake shoe 12. One end of the retractile spring 23 is connected to a link 34 which in turn is connected to the brake shoe 11. Under some conditions it is found desirable to have this link rest against the side of and form a guide for the lever 28 to prevent vibration and rattling of this lever when the machine is traveling over a rough road. The retractile spring 23 must be of sufficient strength to return the brake shoes to off position and also to return the piston 16 with sufficient force to drive the fluid from the cylinder 14 back through the conduits and past the return valve which is commonly associated with the discharge end of the fluid compressor. Such a return valve is indicated by reference numeral 26 in Loughead Patent No. 1,847,402, dated March 1, 1932.

In Fig. 3 of the drawings I have illustrated a slightly different means for sealing the end of the cylinder 14. In this embodiment the adjusting annulus 21' for the piston rod 17 is provided with threaded openings into which are screwed bolts 40 which secure flexible boots 26' to the flange 22' of the annular member 21'. The other parts shown in this figure are identical with the similar parts of Fig. 2.

Figure 4:
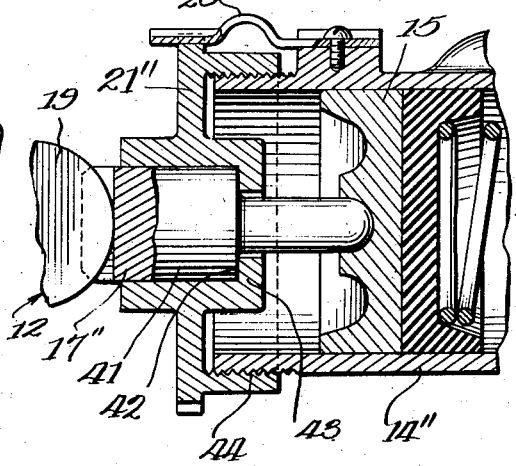

In Fig. 4 the piston rod 17" is not threaded but has an enlarged portion 41 which provides a shoulder 42 which normally rests against the end 43 of a recess formed in the annular member 21" which in turn is threaded at 44 to the end of the cylinder 14". In this embodiment no boot is necessary since the threaded engagement between the end of the cylinder 14" and the annular member 21" provides a sufficient seal to exclude dirt and moisture. In this embodiment it is not necessary that the piston rod 17" be held against rotation.

Having thus described several embodiments of my invention I wish it to be understood that my invention is capable of being incorporated in various forms and that the scope of my invention is to be limited solely by the following claims.

I claim:

1. In mechanism of the class described, the combination of a fluid cylinder, a piston reciprocably mounted therein, a piston rod separably connected to said piston, said cylinder having an end, a member threadedly connected with said piston rod and normally engaging said end to limit inward movement of said piston rod, braking means preventing rotation of said piston rod, resilient means normally preventing rotation of said member, and sealing means connecting said member and cylinder.

2. In mechanism of the class described, the combination of a fluid cylinder, a piston reciprocable therein, a piston rod for said piston, said rod having a shoulder, and a member directly engageable with said shoulder and threadedly connected with said cylinder whereby adjustment of said threaded connection varies the permissible movement of said rod in one direction.

3. In mechanism of the class described, the combination of a brake drum, a supporting pan closing the open end of said drum, a brake element mounted on said pan and adapted to engage said drum, a member mounted on said pan and forming a fluid cylinder, a piston reciprocable therein, a second member constituting a piston rod, said second member having one end engaging said element and another end directly engaging said piston, a spring for holding said piston against said last-mentioned end, an annulus interposed between said members for limiting relative movement therebetween in one direction only, said annulus having an adjustable threaded connection with one of said members and a shoulder for limiting movement in one direction between said annulus and the other member, and means whereby said threaded connection may be manually adjusted without disassembly of said drum and pan.

4. In mechanism of the class described, the combination of a brake drum, a brake shoe engageable therewith, a pan supporting said shoe, a fluid cylinder for applying said shoe against said drum, a piston in said cylinder, a piston rod having one end in direct abutting engagement with said piston and another end engaging said shoe, a member adjustably interposed between said rod and an end of said cylinder to limit movement of said rod in one direction, a spring urging said piston against said rod, means for adjusting said rod from the exterior of said pan, and a spring carried by said cylinder for locking said member in adjusted position.

WALLACE F. OLIVER.